United States Patent [19]
Berto

[11] Patent Number: 5,100,443
[45] Date of Patent: Mar. 31, 1992

[54] AIR FILTER ASSEMBLY

[76] Inventor: Joseph J. Berto, 10980 Torrey Pine Rd., Truckee, Calif. 95737

[21] Appl. No.: 588,019

[22] Filed: Sep. 25, 1990

[51] Int. Cl.⁵ .............................................. B01D 50/00
[52] U.S. Cl. .................................... 55/385.3; 55/498; 55/522; 123/198 E
[58] Field of Search ..................... 55/385.3, 385.1, 498, 55/505, 510, 522; 123/198 E

[56] References Cited
U.S. PATENT DOCUMENTS

| 4,300,496 | 11/1981 | Price | 123/198 E |
| 4,871,381 | 10/1989 | Smith | 55/385.3 |

FOREIGN PATENT DOCUMENTS 75562 6/1980 Japan ................................ 55/385.3

Primary Examiner—Bernard Nozick
Attorney, Agent, or Firm—Burns, Doane, Swecker & Mathis

[57] ABSTRACT

An air filter assembly for an engine such as a chain saw engine. The filter assembly includes a cage, a foam filter having a sidewall surrounding a sidewall of the cage, a retaining member pressing an endwall of the filter against an endwall of the cage and a nut. The nut receives a threaded end of an anchor bolt passing through axially aligned holes in the endwalls of the cage and the filter and a hole in the retaining member. The filter assembly provides high flow rates therethrough and substantially avoids penetration of dirt around the nut connection.

20 Claims, 3 Drawing Sheets

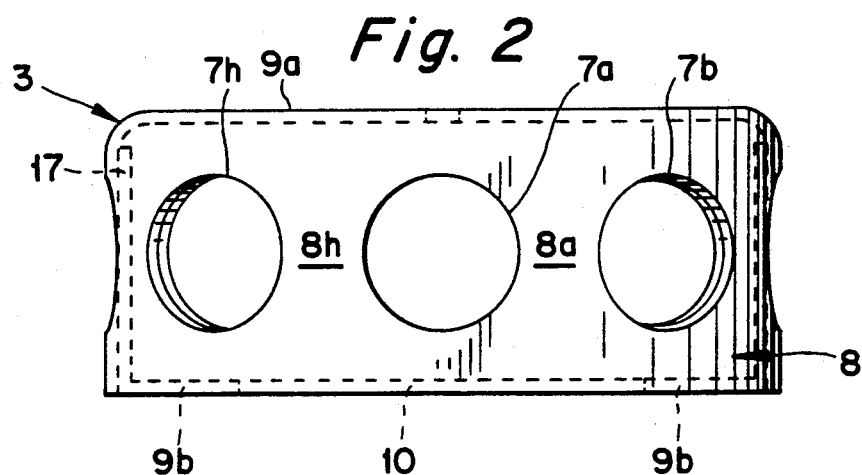
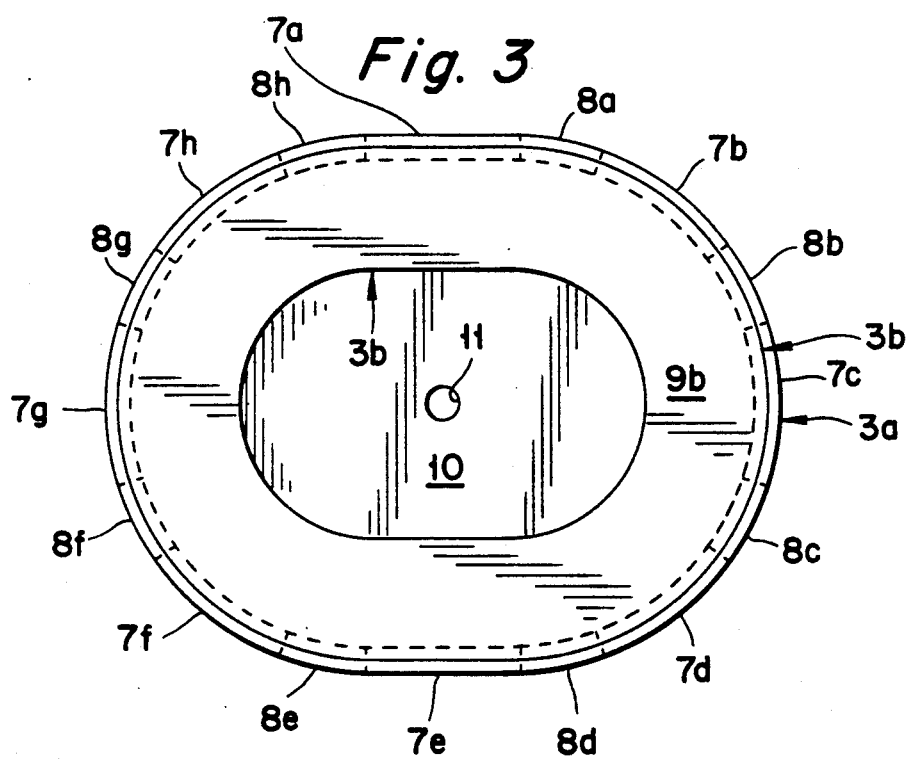
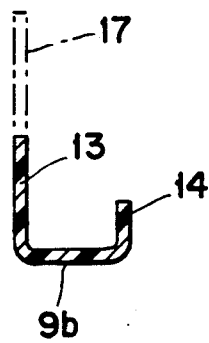
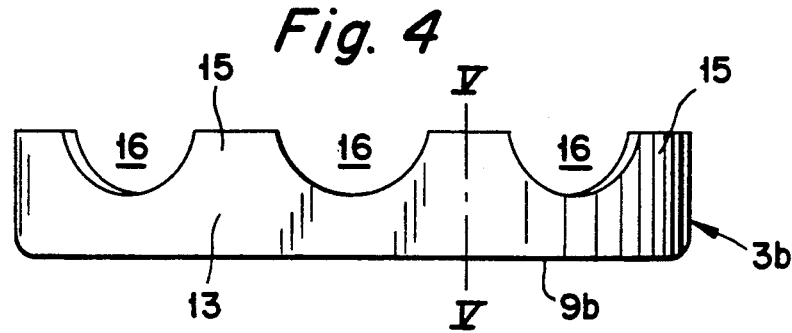

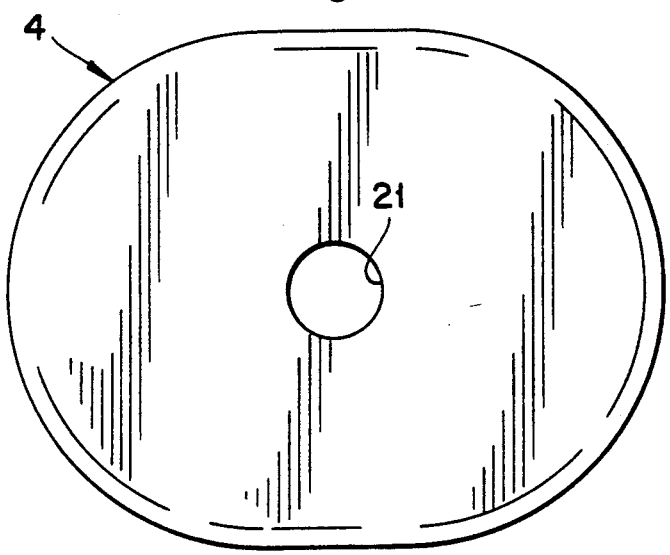
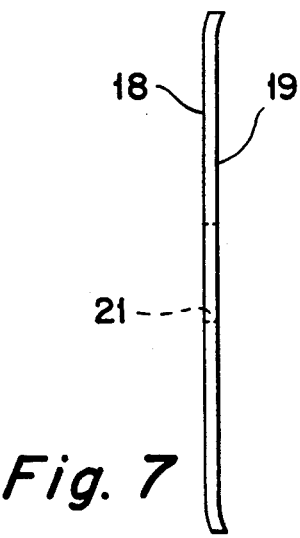
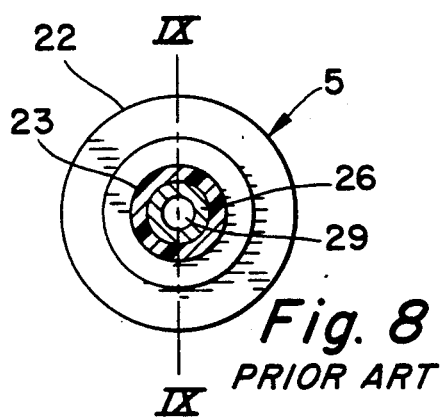
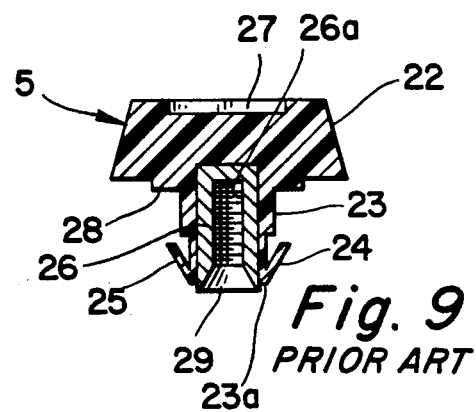
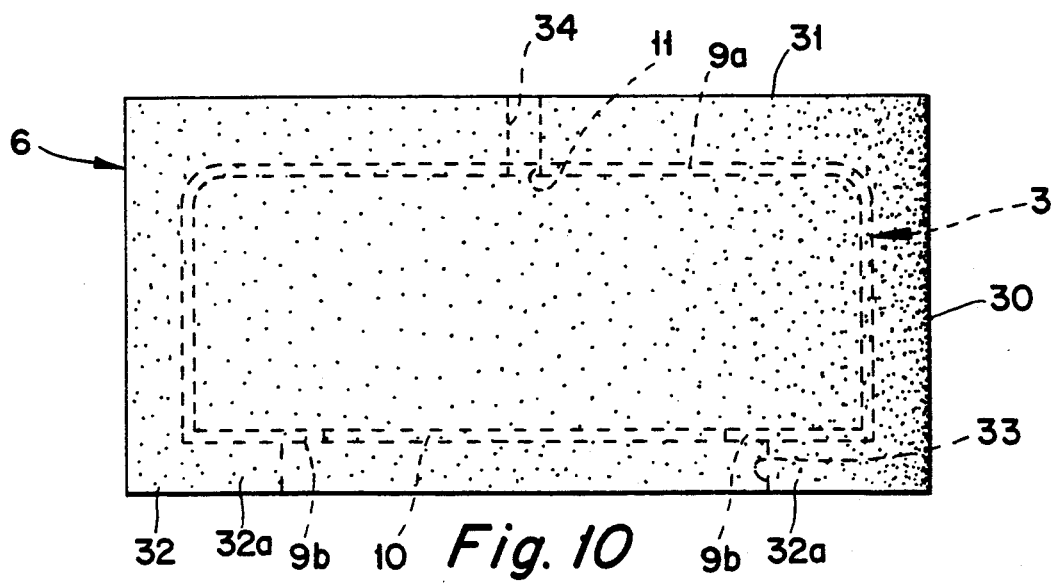

AIR FILTER ASSEMBLY

FIELD OF THE INVENTION

The present invention relates to an air filter assembly for cleaning air for an engine such as an engine of a chain saw.

BACKGROUND OF THE INVENTION

Small gasoline engines power a wide variety of lawn and garden equipment such as lawn mowers, lawn tractors, chain saws, and so forth. In such engines, an air cleaner filters out grit from air entering a carburetor to prevent dirt from getting into the engine, where it would cause excessive wear of moving parts. The air cleaner may have one or more filter elements which must be cleaned or replaced periodically. For instance, most manufacturers suggest cleaning or replacing the filter after every 25 to 50 hours of engine operation, but if the engine is operated in an unusually dusty or sandy area, service of the air cleaner should be performed at even shorter intervals.

Air cleaners typically include paper, foam, or metal air filters. Such filters eventually become clogged, making the engine difficult to start and may cause the engine to stall, run hesitantly, or overheat. Chain saw filters can clog after being used for less than 10 hours.

Most air filters for chain saw engines are located toward the top or rear of the engine, and are either attached directly to the carburetor or connected to it by a short adapter. One conventional air filter, for example, includes a bowl with a layer of oil therein, a filtering element within the bowl with a lower perforated surface thereof facing the layer of oil, and a cover fitted over the filtering element and the bowl such that air enters through an opening between the cover and the bowl, passes between the filtering element and the bowl, then passes upwardly through the lower surface of the filtering element and downward through a pipe at the center of the bowl.

Another conventional air filter includes a metal housing having a lower wall with openings therethrough, a foam filter supported within the housing, and a pipe passing through the foam filter with a lower end of the pipe in fluid communication with an opening through the bottom wall of the housing. The foam filter overlaps the upper edge of the housing and a cover clamps the foam filter against the housing. Air enters the openings in the lower surface of the housing, passes upwardly through the air filter and then downward through the pipe and into the carburetor.

A third type of conventional air filter includes a paper element and a foam sleeve fitted around the paper element. This type of filter includes a lower plate having an opening therethrough in fluid communication with the carburetor and a cylindrical cover which clamps the foam sleeve and paper element against the lower plate such that air passes through an opening between the cover and the lower plate, passes through the foam sleeve, then through the paper element and then through the opening in the lower plate.

Each of the three types of air filters described above includes a bolt passing through the cover for purposes of attaching the cover to the air filter assembly. With such arrangements, dirt can find its way through the opening in the cover and lead to engine problems. Accordingly, there exists a need in the art for a air filter assembly which eliminates the problem of dirt entering through the cover of the air filter assembly.

SUMMARY OF THE INVENTION

Generally speaking, the present invention provides a filter assembly useful for cleaning air for an engine such as an engine of a chain saw. In the preferred embodiment, the filter assembly includes a cage, or case, a filter, connector and a retaining member. In practice, the cage includes opposed first and second spaced-apart endwalls and a sidewall extending therebetween. The sidewall includes air inlet means for passage of air therethrough, the first endwall includes a hole therethrough and the second endwall includes air outlet means for passage of air therethrough.

BRIEF DESCRIPTION OF THE DRAWINGS

The present invention can be further understood with reference to the following description in conjunction with the appended drawings, wherein like elements are provided with the same reference numerals. In the drawings:

FIGS. 2-5 show details of a cage according to the invention, FIG. 2 being a side view thereof, FIG. 3 being a bottom view thereof, FIG. 4 being a side view of part of the cage and FIG. 5 being a cross-section of the part shown in FIG. 4 taken along the line V—V;

FIGS. 6-7 show details of a retaining plate according to the invention, FIG. 6 being a top view thereof and FIG. 7 being a side view thereof;

FIGS. 8-9 show details of a nut which can be used in the air filter assembly according to the invention, FIG. 8 being a bottom view thereof and FIG. 9 being a cross-section taken along the line IX—IX in FIG. 8;

FIG. 10 shows details of a filter element according to the invention, FIG. 10 being a side view of the filter element.

DETAILED DESCRIPTION OF THE PREFERRED EMBODIMENTS

Figure 1:
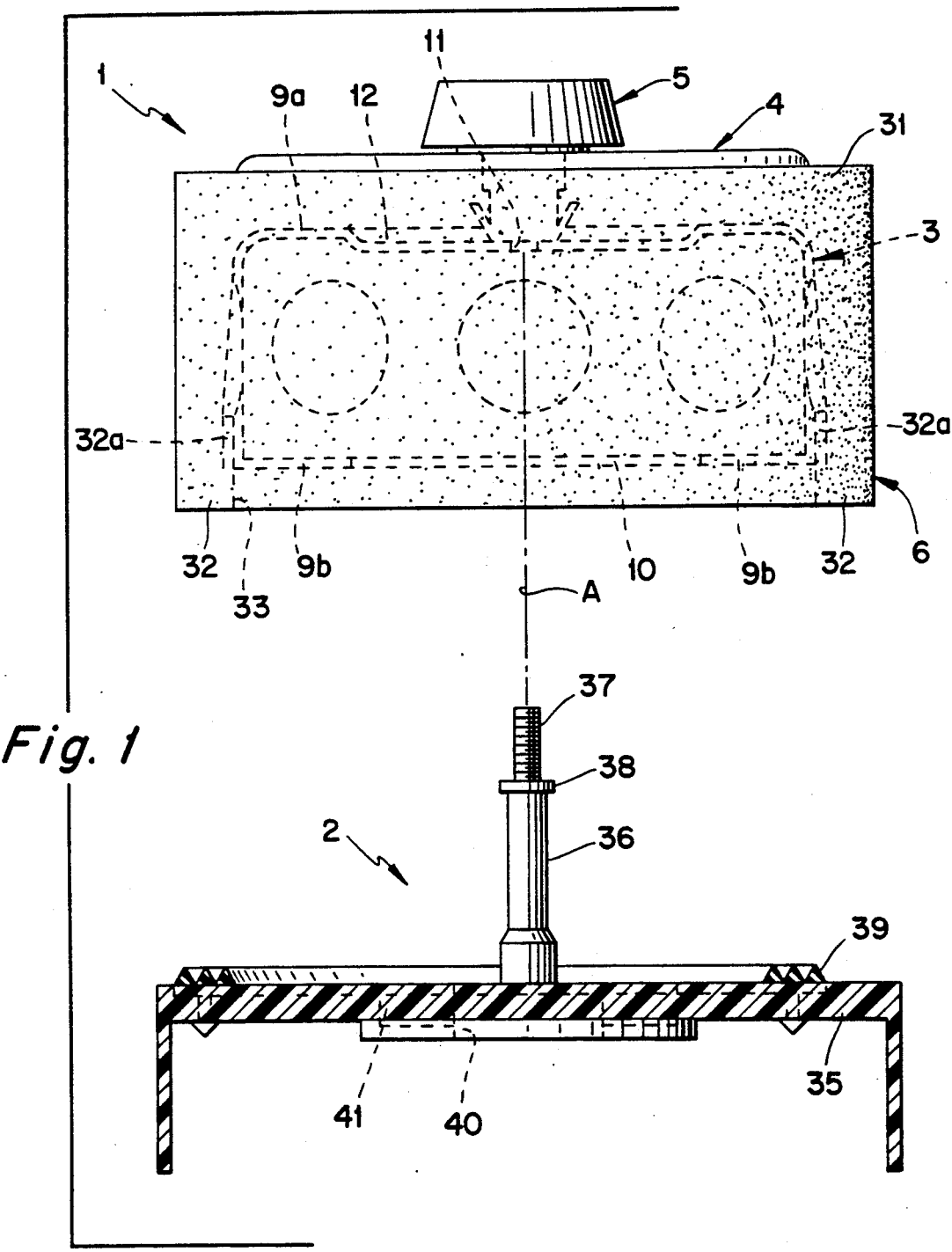
FIG. 1 shows a cross-section of the air filter assembly of the invention and a piece of equipment to which the air filter assembly can be attached.

The filter assembly 1 can be attached to a piece of equipment such as a part of an engine 2 as shown in FIG. 1. The filter assembly includes a cage 3, a retaining member 4, connector means comprising a nut 5 and a filter 6 such as a porous plastic foam filter. This filter assembly 1 can be used for filtering air which is delivered to a carburetor of an engine such as a chain saw engine.

The cage 3 includes a sidewall 8 extending between a first endwall 9a and a second endwall 9b as shown in FIG. 2. The cage includes an air inlet means and an air outlet means. In the preferred embodiment, the air inlet means comprises at least one opening 7 in the sidewall 8 and the air outlet means comprises a flow passage 10 in the second endwall 9a. Alternatively, the cage 3 could be substituted with a suitably shaped structure which does not include openings through the sidewall 8 and/or endwall 9a. For instance, the cage could comprise a paper or foam filter element.

In the preferred embodiment, the cage is elliptical in shape and includes eight spaced-apart openings 7a-h in the sidewall 8 as shown in FIG. 3. The openings 7a-h are separated by portions 8a-h of the sidewall 8. Each of the openings 7a-h can have a diameter greater than one-half a distance between the first and second endwalls 9*a*, 9*b*. For instance, the diameter of the holes 7*a–h* can be three-fourths the distance between the endwalls 9*a*, 9*b*. The openings 7 can be separated from each other by a distance less than one-half the diameter of the openings 7.

The cage can comprise a single piece or multi-piece construction. For instance, the c 3 can include an outer part 3*a* and an inner part 3*b*. The part 3*a* includes the first endwall 9*a* and the sidewall shown in FIG. 2. The inner part 3*b* includes the second 9*b* and can be L-shaped in cross-section as shown FIG. 5. In one embodiment, the inner part 3*b* an outer wall 13 having a height of about one-half the height of the sidewall 8 and an inner wall 14 connected to the outer wall 13 by the second endwall 9*b*. As shown in FIG. 4, the outer wall 13 includes extensions 15 which define semicircular openings 16 therebetween. The openings 16 are the same size as the openings 7 and when the inner part 3*b* is fitted within the outer part 3*a*, the openings 7 and 16 are coincident with each other.

In another embodiment, the inner part 3*b* includes an additional wall 17 (shown in dotted lines in FIG. 5) which together with the wall 1 extends the full height of the sidewall 8 as shown in FIG. 2. The wall 17 includes the openings 16 therein. The inner part 3*b* can be glued to outer part 3*a* or, alternatively, the inner part 3*b* and the outer part 3*a* can be welded together. For instance, the inner and outer parts can be made of plastic and spot welded together by melting adjoining portions of the inner and outer parts.

The cage 3 also includes a hole 11 extending through the first endwall 9*a*. The hole 11 can be located in an optional recessed portion 12 of the first endwall 9*a* as shown in FIG. 1. In the preferred embodiment, the hole 11 is located in the center of the first endwall 9*a*.

In the preferred embodiment, the retaining member 4 comprises a flat rigid plate having a first surface 18 on one side thereof and a second surface 19 on the opposite side thereof as shown in FIGS. 6 and 7. The plate is elliptical in shape and an outer periphery of the plate is spaced inwardly of an outer periphery of the filter 6 as shown in FIG. 1. The retaining member also includes a hole 21 which is aligned in an axial direction A with the hole 11 in the cage 3. The retaining member 3 tightens up the foam filter 6 as well as reduces the likelihood that dirt and rain will enter the carburetor.

In the preferred embodiment, the connector means 5 comprises a nut having a head 22 and a shank 23, the shank 23 being small enough to fit through the opening 21 in the retainer plate 4. The shank 23 includes at least one resilient finger 24 extending outwardly therefrom. In particular, the shank 23 includes two resilient fingers 24, 25 which are inclined to the axial direction A. The finger 24 is deformable to a first position to allow the shank to pass through the hole 2; in the retaining member 4. The finger 24 is normally in a second position when not deformed such that the retaining plate is slidable on the shank 23 between the head 22 and the finger 24.

The head 22 and shank 23 can be of plastic and a metal insert 26 having an internally threaded bore 26*a* therein can be fitted within a bore extending into a free end 23*a* of the shank 23. The metal insert 26 can include an outwardly tapered portion 29 between the threaded bore 26*a* and the free end 23*a* of the shank 23. The tapered portion 29 makes it easy to thread the nut on an anchor bolt.

The head 22 includes a rectilinearly extending slot 27 on a surface thereof opposite to the free end 23*a* of the shank 23. A screwdriver can be inserted in the slot 27 for tightening or loosening the nut. The head 22 also includes a bearing surface 28 having a diameter greater than a diameter of the hole 21 in the retaining member 4. The bearing surface 28 contacts the first surface 18 of the retaining member and presses the retaining member against the filter 6 for tightening the filter when in use on a piece of equipment.

The free end 23*a* of the shank presses against the first endwall 9*a* of the cage 3. In particular, the free end 23*a* of the shank has a diameter greater than a diameter of the hole 11 in the first endwall 9*a* of the cage and an outer periphery of the free end 23*a* of the shank 23 completely surrounds the hole 11 so as to provide a seal when the connector 6 attaches the filter assembly 1 to a piece of equipment.

In the preferred embodiment, the filter 6 comprises a single piece of porous plastic foam. The filter 6 includes a first endwall 31, a second endwall 32 and a sidewall 30 extending therebetween. A hole 34 in the first endwall 31 is axially aligned with the hole 11 in the cage 3 and the hole 21 in the retaining member 4. An air flow passage 33 in the second endwall 32 is in fluid communication with the flow passage 10 in the cage 3.

The filter 6 is supported by the cage 3 with the sidewall 30 of the filter 6 surrounding the sidewall 8 of the cage 3 as shown in FIG. 1. The combined thickness in the axial direction of the retaining member 4 and the first endwall 31 of the filter 6 can be less than the distance between the free end 23*a* of the shank 23 and the bearing surface 28. In this case, the first endwall 31 of the filter 6 is compressed between the retaining member 4 and the first endwall 9*a* of the cage 3 when the connector means attaches the filter assembly to a piece of equipment to thereby provide an effective seal around the nut connection.

As shown in FIG. 1, the engine part 2 can include a support surface 35, an anchor bolt 36 supported on the support surface 35 with a threaded free end 37 of the anchor bolt facing away from the support surface and an air inlet 40 to a carburetor of an engine extending into the support surface. The bolt 36 can include a flange 38 which engages the underside of the first endwall 9*a* of the cage 3. A rubber gasket 39 is supported on the support surface and extends around the anchor bolt 36 and the air inlet 40 in the support surface 35. The free end 37 of the anchor bolt 36 extends through the hole 11 in the cage, the hole 34 in the filter 6 and the hole 21 in the retaining member 4. The connector 5 is threaded into the threaded end 36 of the anchor bolt 36 to sealingly engage the second endwall 9*b* of the cage 3 with the gasket 39. The support surface 35 can be of plastic and include a metal insert 40 which defines the air inlet 40 as well as provides support for the bolt 36.

As shown in FIG. 1, a portion 32*a* of the second endwall 32 of the filter can be folded inwardly so as to be compressed between an outer periphery of the sidewall 8 of the cage 3 and an inner periphery of the sidewall 30 of the filter. Alternatively, the portion 32*a* of the second endwall 32 of the filter 6 can remain as shown in FIG. 10 so as to underlie the endwall 9*b* of the cage 3.

The above-described filter design breathes better, cleans easier and costs less than the Stihl O.E.M. factory heavy duty filter for the Stihl 044, 064 and 084 professional chain saws. The filter system is simple and can be provided in different combinations of cages, filters and covers. The following example illustrates the effectiveness of the air filter system.

EXAMPLE

In a test on a Superflow 110 flow bench using 9" of water as a reference, the following results were obtained:

| | Filter System | Flow Rate |
|---|---|---|
| 1. | Stock Stihl H.D. Filter Used Oiled and Cleaned Per Factory Instructions | 77 CFM |
| 2. | Stock Stihl H.D. Filter New, No Oil | 89 CFM |
| 3. | Stock Stihl H.D. Filter, New and Inventive Outer Filter, Oiled | 122 CFM |
| 4. | Inventive 3 Piece Filter System Including Cage, Oiled Filter and Nut Plate | 135 CFM |

When the inventive filter is combined with the factory filter, flow is 60% better than a used and cleaned H.D. filter and 35% better than a new un-oiled filter.

For maximum airflow, the inventive filter utilizing the special replacement cage provides flow increases of 75%.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A filter assembly useful for cleaning air for an engine such as an engine of a chain saw, the filter assembly comprising:
   a cage including opposed first and second spaced-apart endwalls and a sidewall extending therebetween, the sidewall including air inlet means for passage of air therethrough, the first endwall including a hole therethrough and the second endwall including air outlet means for passage of air therethrough;
   a filter supported by the cage, the filter including opposed first and second spaced-apart endwalls and a sidewall extending therebetween, the sidewall of the filter surrounding the sidewall of the cage, the first endwall of the filter overlying the first endwall of the cage, the second endwall of the filter underlying the second endwall of the cage, the first endwall of the filter including a hole extending therethrough and aligned in an axial direction with the hole in the first endwall of the cage, the second endwall of the filter including a flow passage extending therethrough and in fluid communication with the air outlet means of the cage;
   connector means for attaching the cage and filter to a piece of equipment so that the air outlet means of the cage and flow passage of the filter are in fluid communication with each other and with an air inlet of the equipment; and
   a retaining member disposed between the first endwall of the filter and the connector means, the retaining member having a hole therethrough aligned in a axial direction with the holes in the cage and filter.

2. The filter assembly of claim 1, wherein the second endwall of the filter extends radially inwardly from an inner periphery of the sidewall of the filter.

3. The filter assembly of claim 1, wherein the filter comprises a single piece of foam.

4. The filter assembly of claim 1, wherein the air passage means in the cage comprises a plurality of openings, the openings adjacent each other being separated by a distance which is less than one-half a diameter of the openings.

5. The filter assembly of claim 1, wherein the filter comprises a single piece of porous plastic foam material and the cage and retaining member are each of substantially rigid plastics material.

6. The filter assembly of claim 1, wherein the cage comprises an outer part supporting the filter and an inner part adapted to seal the filter assembly to a piece of equipment such as an engine part in fluid communication with an inlet of a carburetor, the inner part including a continuous surface surrounding a flow passage in the second endwall of the cage comprising the air outlet means, the air inlet means comprising a plurality of spaced-apart openings in the outer part.

7. The filter assembly of claim 1, wherein a portion of the second endwall of the filter extends between an outer periphery of the sidewall of the cage and an inner periphery of the sidewall of the filter.

8. The filter assembly of claim 1, wherein the retaining member comprises a substantially flat rigid plate having opposed first and second surfaces, the first surface of the plate being adjacent the connector means and the second surface of the plate being adjacent the first endwall of the filter, the filter, the cage and the retaining member comprising separate pieces which are separable from each other.

9. The filter assembly of claim 8, wherein the plate is elliptical in shape taken in a plane perpendicular to the axial direction and the filter is elliptical in shape taken in a plane perpendicular to the axial direction, the plate having an outer periphery located inwardly of an outer periphery of the filter.

10. The filter assembly of claim 1, wherein the air passage means in the cage comprises a plurality of spacedapart openings, each of the openings having a diameter greater than one-half a distance between the first and second endwalls of the cage.

11. The filter assembly of claim 10, wherein the diameter of each of the openings is about three-fourths the distance between the first and second endwalls of the cage.

12. The filter assembly of claim 1, wherein the cage comprises first and second discrete parts, the first part including the first endwall of the cage and the second part including the second endwall of the cage, at least one of the first and second parts including the sidewall of the cage.

13. The filter assembly of claim 12, wherein the first part includes the sidewall of the cage and the second part includes an outer wall having an outer surface thereof abutting no more than one-half of an inner surface of the sidewall of the first part.

14. The filter assembly of claim 12, wherein the sidewall of the cage comprises a sidewall of the first part and a sidewall of the second part, the entire sidewall of the first part being in contact with the entire sidewall of the second part, the air passage means in the sidewall of the cage comprising a plurality of spaced-apart openings in the sidewalls of the first and second parts, the openings in the first and second parts being coincident with each other to allow passage of air through the sidewall of the cage.

15. A filter assembly useful for cleaning air for an engine such as an engine of a chain saw, the filter assembly comprising:
- a cage including opposed first and second spaced-apart endwalls and a sidewall extending therebetween, the sidewall including air inlet means for passage of air therethrough, the first endwall including a hole therethrough and the second endwall including air outlet means for passage of air therethrough;
- a filter supported by the cage, the filter including opposed first and second spaced-apart endwalls and a sidewall extending therebetween, the sidewall of the filter surrounding the sidewall of the cage, the first endwall of the filter including a hole extending therethrough and aligned in an axial direction with the hole in the first endwall of the cage, the second endwall of the filter including a flow passage extending therethrough and in fluid communication with the air outlet means of the cage;
- connector means for attaching the cage and filter to a piece of equipment so that the air outlet means of the cage and flow passage of the filter are in fluid communication with each other and with an air inlet of the equipment; and
- a retaining member disposed between the first endwall of the filter and the connector means, the retaining member having a hole therethrough aligned in the axial direction with the holes in the cage and filter; and
- the connector means comprising a nut having a head and a shank, the shank having a free end thereof pressing against the first endwall of the cage, the free end of the shank having a diameter greater than a diameter of the hole in the first endwall of the cage, an outer periphery of the free end of the shank completely surrounding the hole in the first endwall of the cage when the connector means attached the cage and the filter to the piece of equipment.

16. A filter assembly useful for cleaning air for an engine such as an engine of a chain saw, the filer assembly comprising:
- a cage including opposed first and second spaced-apart endwalls and a sidewall extending therebetween, the sidewall including air inlet means for passage of air therethrough, the first endwall including a hole therethrough and the second endwall including air outlet means for passage of air therethrough;
- a filter supported by the cage, the filter including opposed first and second spaced-apart endwalls and a sidewall extending therebetween, the sidewall of the filter surrounding the sidewall of the cage, the first endwall of the filter including a hole extending therethrough and aligned in an axial direction with the hole in the first endwall of the cage, the second endwall of the filter including a flow passage extending therethrough and in fluid communication with the air outlet means of the cage;
- connector means for attaching the cage and filter to a piece of equipment so that the air outlet means of the cage and flow passage of the filter are in fluid communication with each other and with an air inlet of the equipment; and
- a retaining member disposed between the first endwall of the filter and the connector means, the retaining member having a hole therethrough aligned in the axial direction with the holes in the cage and filter; and
- an engine part, the engine part including a support surface, an anchor bolt supported on the support surface with a free end of the anchor bolt facing away from the support surface, an air inlet to a carburetor of the engine extending into the support surface, and gasket means supported on the support surface and extending around the anchor bolt and the air inlet in the support surface, the free end of the anchor bolt extending through the holes in the cage, the retaining member and the filter and the connector means attached to the anchor bolt with the second endwall of the cage in sealing engagement with the gasket means.

17. A filter assembly useful for cleaning air for an engine such as an engine of a chain saw, the filter assembly comprising:
- a cage including opposed first and second spaced-apart endwalls and a sidewall extending therebetween, the sidewall including air inlet means for passage of air therethrough, the first endwall including a hole therethrough and the second endwall including air outlet means for passage of air therethrough;
- a filter supported by the cage, the filter including opposed first and second spaced-apart endwalls and a sidewall extending therebetween, the sidewall of the filter surrounding the sidewall of the cage, the first endwall of the filter including a hole extending therethrough and aligned in an axial direction with the hole in the first endwall of the cage, the second endwall of the filter including a flow passage extending therethrough and in fluid communication with the air outlet means of the cage;
- connector means for attaching the cage and filter to a piece of equipment so that the air outlet means of the cage and flow passage of the filter are in fluid communication with each other and with an air inlet of the equipment; and
- a retaining member disposed between the first endwall of the filter and the connector means, the retaining member having a hole therethrough aligned in the axial direction with the holes in the cage and filter; and
- the shank including at least one resilient finger extending outwardly therefrom, the resilient finger being deformable to a first position to allow the shank to pass through the hole in the plate and being in a second position when not deformed such that the plate is slidable on the shank between the head and the resilient finger.

18. The filter assembly of claim 17, the head including a bearing surface having a diameter greater than a diameter of the hole int eh plate, the bearing surface contacting the first surface of the plate and pressing the plate against the filter for tightening of the filter when in use on the piece of equipment.

19. A filter assembly useful for cleaning air for an engine such as an engine of a chain saw, the filter assembly comprising:
- a cage including opposed first and second spaced-apart endwalls and a sidewall extending therebetween, the sidewall including air inlet means for passage of air therethrough, the first endwall including a hole therethrough and the second endwall including air outlet means for passage of air therethrough;
- a filter supported by the cage, the filter including opposed first and second spaced-apart endwalls and a sidewall extending therebetween, the sidewall of the filter surrounding the sidewall of the cage, the first endwall of the filter including a hole extending therethrough and aligned in an axial direction with the hole in the firs endwall of the cage, the second endwall of the filter including a flow passage extending therethrough and in fluid communication with the air outlet means of the cage;
- connector means for attaching the cage and filter to a piece of equipment so tat the air outlet means of the cage and flow passage of the filter are in fluid communication with each other and with an air inlet of the equipment; and
- a retaining member disposed between the first endwall of the filter and the connector means, the retaining member having a hole therethrough aligned in the axial direction with the holes in the cage and filter; and
- the filter comprising a porous foam plastic filter and the connector means comprises a nut having a head and a shank, the head including a bearing surface pressing against an outer periphery of the hole in the retaining member and the shank having a free end pressing against the first endwall of the cage, a distance between the bearing surface of the head and the free end of the shank being less than a combined thickness in the axial direction of the retaining member and the first endwall of the filter, the first endwall of the filter being compressed between the retaining member and the first endwall of the cage when the connector means attached the filter assembly to a piece of equipment.

20. A filter assembly useful for cleaning air for an engine such as an engine of a chain saw, the filter assembly comprising:
- a cage including opposed first and second spaced-apart endwall sand a sidewall extending therebetween, the sidewall including air inlet means for passage of air therethrough, the first endwall including a hole therethrough and the second endwall including air outlet means for passage of air therethrough;
- a filter supported by the cage, the filter including opposed first and second spaced-apart endwalls and a sidewall extending therebetween, the sidewall of the filter surrounding the sidewall of the cage, the first endwall of the filter including a hole extending therethrough and aligned in an axial direction with the hole in the first endwall of the cage, the second endwall of the filter including a flow passage extending therethrough and in fluid communication with the air outlet means of the cage;
- connector means for attaching the cage and filter to a piece of equipment so that the air outlet means of the cage and flow passage of the filter are in fluid communication with each other and with an air inlet of the equipment; and
- a retaining member disposed between the first endwall of the filter and the connector means, the retaining member having a hole therethrough aligned in the axial direction with the holes in the cage and filter; and
- a chain saw engine which includes an inlet to a carburetor of the engine, the engine further including a gasket surrounding the carburetor inlet and an anchor bolt, a free end of the anchor bolt being attached to the connector means such that the second endwall of the cage sealingly engages the gasket and the air outlet means of the cage is in fluid communication with the carburetor inlet.

* * * * *